(12) United States Patent
McHugh et al.

(10) Patent No.: US 7,169,857 B2
(45) Date of Patent: Jan. 30, 2007

(54) HOMOGENOUS COMPOSITIONS OF FLUOROPOLYMERS AND CRYSTALLINE SOLIDS OR CROSS-LINKING AGENTS AND METHODS OF MAKING THE SAME

(75) Inventors: Mark A. McHugh, Richmond, VA (US); Dan Li, Richmond, VA (US); Michael Oka, Mahwah, NJ (US)

(73) Assignees: Virginia Commonwealth University, Richmond, VA (US); Daiken America, Inc., Orangeburg, NY (US)

( * ) Notice: Subject to any disclaimer, the term of this patent is extended or adjusted under 35 U.S.C. 154(b) by 119 days.

(21) Appl. No.: 10/677,746

(22) Filed: Oct. 3, 2003

(65) Prior Publication Data

US 2005/0075460 A1    Apr. 7, 2005

(51) Int. Cl.
*C08C 19/18*    (2006.01)
(52) U.S. Cl. .................. 525/383; 525/326.2; 264/405; 264/464; 264/472; 264/486
(58) Field of Classification Search ................ 525/383, 525/326.2; 264/405, 464, 472, 486
See application file for complete search history.

(56) References Cited

U.S. PATENT DOCUMENTS

| | | | |
|---|---|---|---|
| 5,548,004 A | 8/1996 | Mandel et al. | |
| 5,766,522 A | 6/1998 | Daly et al. | |
| 6,051,682 A * | 4/2000 | Debrabander et al. | 528/501 |
| 6,960,633 B2 * | 11/2005 | Wynne et al. | 525/383 |

* cited by examiner

*Primary Examiner*—Robert D. Harlan
(74) *Attorney, Agent, or Firm*—Whitham, Curtis, Christofferson & Cook, PC (57) ABSTRACT

Fluoroelastomers are combined with chemical agents in the presence of supercritical carbon dioxide by swelling the fluoroelastomer with the carbon dioxide, and impregnating the swollen fluorelastomer with the chemical agent. The process can be conducted at relatively low temperatures and pressures such that degradation of the fluoroelastomer or the chemical agent is avoided. The chemical agent is preferably a curing agent which includes functional groups that interact with functional groups on the fluoroelastomer to create an association therebetween. The process is enhanced by pre-dissolving the chemical agent in a solvent which does not solubilize the fluoroelastomer to a great extent, but which is itself soluble in supercritical carbon dioxide. In addition, during combining, mechanical mastication is performed to create a free flowing powder.

27 Claims, 1 Drawing Sheet

Figure 1

HOMOGENOUS COMPOSITIONS OF FLUOROPOLYMERS AND CRYSTALLINE SOLIDS OR CROSS-LINKING AGENTS AND METHODS OF MAKING THE SAME

BACKGROUND OF THE INVENTION

1. Field of the Invention

The invention generally relates to a method of mixing crystalline solids with fluoropolymeric materials and, more particularly, to a methodology which utilizes supercritical carbon dioxide to combine solid materials with elastomeric fluoropolymer materials in a homogenous blend.

2. Background of the Invention

Polymer technology has employed supercritical carbon dioxide as an alternative fluid medium to replace harmful organic solvents. The use of supercritical carbon dioxide in the synthesis of polymers is discussed in Cooper, A. I., *J. Mater. Chem.* 10:207 (2000); Ajzenberg et al., *Chem. Eng. Technol.* 23(10), 829 (2000), and U.S. Pat. Nos. 5,496,901 and 5,618,894, which are herein incorporated by reference. These references describe solubilizing monomers, including fluoromonomers, in carbon dioxide, and then polymerizing the solubilized monomers to form polymers of interest. Supercritical carbon dioxide has also been used to extract low molecular weight components from polymer matrices as discussed in McHugh et al. *Supercritical Fluid Extraction*, Butterworth-Heineman, 1994. In addition, supercritical carbon dioxide has been used as a blowing agent for the production of polymer foams as discussed in Utracki et al. *J. Polym. Sci. Part B-Polymer Physics* 39(3), 342 (2001) and Cooper, ibid. Furthermore, supercritical carbon dioxide is used for polymer processing. See, Kwag et al., *Ind. Eng. Chem. Res.* 40(14), 3048 (2001) and Royer et al., *J. Polym. Sci: Polym. Physics* 38(23), 3168 (2000). Coating applications require dissolution or suspension of polymer in solvent. Supercritical carbon dioxide has been used as a solubilizing and suspending media because of its benign nature and solvent characteristics as a function of temperature and pressure in the supercritical state. See, for example, U.S. Pat. Nos. 5,696,195, 6,034,170, and 6,248,823, all of which are herein incorporated by reference. There is a high affinity of amorphous fluoropolymers for supercritical carbon dioxide (see, Kazarian, *J. Amer. Chem. Soc.* 118(7), 1729 (1996). This may be due to interactions between carbon dioxide molecules in the supercritical phase and C=O and C—F bonds in the fluoropolymer.

Several other references are related to combinations of fluoropolymers and supercritical fluids, such as carbon dioxide. U.S. Pat. No. 5,530,049 to Tuminello describes compositions of perflourinated polytetrafluoroethylene (PTFE) dissolved in supercritical carbon dioxide. Japanese Patent Application 98233244 describes purification of fluoropolymers by dissolving the fluoropolymer in a medium which contains a supercritical fluid. U.S. Pat. No. 6,034,170 to Dee describes compositions of supercritical carbon dioxide and fluoropolymers where the ratio of hydrogen atoms to fluorine atoms is controlled. U.S. Pat. No. 5,821,273 describes the use of supercritical carbon dioxide as a foaming agent for fluoropolymers. U.S. Pat. No. 5,863,612 to Desimone describes preparing fluoropolymers from a composition including fluoromonomers in supercritical carbon dioxide. U.S. Pat. No. 5,645,894 to Trankiem discloses coating a razor blade with PTFE using a dispersion of PTFE in supercritical fluid. Japanese Patent Application JP 91205307 describes a fractionating process involving fluorochemicals and supercritical or subcritical carbon dioxide. U.S. Pat. No. 5,696,195 to McHugh describes the production of foams or webs using supercritical sulfur hexafluoride and tetrafluoroethylene polymer.

Fluoropolymers have superior chemical and solvent resistance characteristics, and excellent thermal stability. Because of these properties, fluoropolymers have been increasingly used in the chemical and semiconductor industry. However, processing of certain fluoropolymers, particularly PTFE and "modified" PTFE, can be difficult. For example, PTFE is not moldable or extrudable. Rather, PTFE components are typically cut or shaved from billets of material. PTFE is often processed by techniques that resemble those for ceramics. PTFE is sintered at 370° C. before being formed by processes such as ram extrusion (see Scheirs, *Modern Fluoropolymers*, John Wiley & Sons, New York, 1997). Recently, fluoropolymer thermolysis (burning) and sintering has been identified as a potential source of halogenated organic acids in the environment (see Ellis et al., *Nature* 412:321–324 (2001)). These halo-acids, such as trifluoroacetic acid are persistent in the environment, as they have no known degradation process (see Boutonnet et al., *Human and Ecological Risk Assessment* 5:59–124 (1999)).

U.S. Pat. No. 5,567,769 to Noda describes the preparation of a homogenous blend of a styrene and methyl methacrylate or 1,2 butadiene which involves the uses of supercritical fluid. In the process, the polymers, which are thermodynamically immiscible, are expanded through a narrow opening, and then fluid evaporation results in the deposition of a homogenous material. A similar technology is described in U.S. Pat. No. 5,290,827 to Shine.

U.S. Pat. No. 5,548,004 to Green describes the production of a coating powder made from two different organic materials which are combined with supercritical carbon dioxide, agitated in situ, and then discharged into a vessel that is at lower pressure than the vessel in which the constituents are combined. U.S. Pat. No. 5,766,522 to Daly describes the production of a powder coating wherein PTFE and/or a thermosettable resin developed in a continuous extruder using supercritical carbon dioxide and a stream of precursor chemical. The process produces a powder coating. Similar technology is described in U.S. Pat. No. 6,114,414 to Daly. U.S. Pat. Nos. 5,672,667 and 5,530,077 to Desimone describe multiphase mixtures which are prepared with a variety of polymers in supercritical carbon dioxide.

German Patent De 42023320 to Benken describes using a supercritical fluid such as carbon dioxide or an alkane to carry an impregnating material into the pores of a substrate. For example, flavorants or aromas can be impregnated into food and cigarette products. U.S. Pat. No. 5,968,654 to Lee describes modifying a polymer substrate by contacting it with a fluorinated compound distributed within a supercritical fluid.

SUMMARY OF THE INVENTION

It is an object of the invention to provide a new method of combining elastomeric fluoropolymer materials with additives such as crystalline materials, crosslinking agents, etc. which is effective at low temperatures and pressures.

It is another object of the invention to provide a new method of combining a crosslinking agent with a fluoroelastomeric polymer.

It is another object of the invention to provide powderized, homogenous compositions which include polymeric materials combined with and/or coating additives such as crystalline materials, crosslinking agents, etc.

According to the invention, supercritical carbon dioxide is used to expand the elastomeric fluoropolymer and make it more amenable to impregnation by the additive (chemical agent). Under mild temperature and pressure conditions in the presence of supercritical carbon dioxide, the additive becomes associated with the polymer and, with agitation or mastication, a free flowing powder of polymer/chemical agent particles can be produced. If the chemical agent is not soluble in supercritical carbon dioxide, it is first dissolved in a solvent that will dissolve in supercritical carbon dioxide but which will not itself solubilize the polymer to any significant extent. Preferably, the chemical agent is solubilized virtually to the point of saturation in the solvent. Then, the solvent with solubilized chemical agent is combined in supercritical carbon dioxide with the polymer, and impregnates the polymer with the chemical agent. The solvent and supercritical carbon dioxide are removed during or after mixing to produce a free flowing powder of polymer/chemical agent particles (e.g., polymer coated chemical agent particles).

DETAILED DESCRIPTION OF THE PREFERRED EMBODIMENTS OF THE INVENTION

This invention allows combining chemical agents such as crystalline solids, crosslinkers, and the like with elastomeric fluoropolymer materials to form homogenous blends. The invention has particular application to the formation of powderized homogenous blends which can be molded, extruded, or subjected to other processing operations to yield components that include the chemical agent uniformly distributed within the polymer matrix or forming part of the polymer matrix by being associated with the polymer (e.g., complexed with the polymer or bonded (e.g., ionic, hydrogen, covalent) to the polymer). The polymers of interest include most fluoroelastomers (and most preferably thermosetting fluoroelastomers which are permanently joined in subsequent processing steps of the homogenous blended powder produced by this invention by heating above a curing temperature), and the preferred polymers will contain one or more substituent groups that can form a chemical complex, such as a proton donor-proton acceptor complex, with the additive. Typical elastomers within the context of this invention will contain repeat groups such as fluorinated ethylene, flourinated propylene, fluorinated vinyl ether, cyanide groups, hydroxyl groups, amine groups, carbonyl groups, vinyl groups, ethers, esters, aromatics, etc. Preferably, the chemical complex will typically exhibit an interaction strength that is greater than a physical interaction such as nonpolar dispersion interactions. The additives (chemical agents) which may be used in the practice of this invention are preferably crystalline solids, and include but are not limited to, high temperature melting solids that contain substituent groups that can form chemical complexes with the substituent groups in the elastomeric polymer. The crystalline solid additives typically will contain functional groups such as amines, hydroxyls, carboxylic acids, carbonyls, ethers, esters, aromatics, etc. The chemical agents may be crosslinking agents, dyes, pigments, fillers, and tougheners.

For exemplary purposes, a polymer within the practice of this invention may be an amorphous polymer that is a terpolymer containing, on average, one cyanide group per 100 repeat groups. The chemical structure of this exemplary polymer is set forth below:

Fluoropolymer "A"

These polymers are generally produced by emulsion polymerization methods using ammonium persulfate as an initiator, the terminal ends are thought to be —COOH, —$OSO_3H$ or their metal salts.

For exemplary purposes, a chemical agent within the practice of this invention may be a crystalline solid additive that has several amines and have the chemical structure set forth below ($T_{melt}=180°$ C.):

Additive "A"

where X can be a hydrogen, or an amine moiety (or other functional group), wherein in this example at least two X moieties are preferably amines ($NH_2$). As can be seen from these exemplary structures, complexes between the amines of the additive and the cyano group of the polymer may result.

Under the preferred milder conditions of the present blending process, the chemical agent is predominantly non-covalently associated with the polymer cyano groups. Under curing conditions, which may involve higher temperature and/or the use of a catalyst, these complexes may react and form a cross-linked matrix resulting in a thermoset material. It should be understood that the powderized blend produced by the present process is preferably capable of curing in subsequent processing steps utilizing curing conditions, such as molding or extrusion, to form a thermoset article.

As will be recognized by those of skill in the art, the invention may be practiced with a wide range of different fluorelastomeric polymers and chemical additives. The molecular weight of the polymeric materials which can be used within the practice of this invention may vary widely, such as, for example, from less than 0.1 kd to more than 10,000 kd. The experiments below demonstrate that the functional groups on the elastomeric fluoropolymer materials can vary widely (e.g., cyanos versus acetates), and can be any of a variety of moieties. Likewise, the functional groups on the chemical agents which are combined with the polymers can vary widely, and the functional groups on the polymers and chemical agents used in the practice of this invention will be chosen so as to form an association (e.g., complex or bond (covalent, ionic, hydrogen, etc.)) between the chemical agents and the polymers. Finally, the experiments performed demonstrate the robust character of the invention in that degree of substitution on the fluoropolymer chain can vary widely.

The principal requirement for fluoropolymer selection is that the supercritical carbon dioxide exhibit some solubility in the elastomeric polymer causing the polymer material to swell.

The supercritical carbon dioxide assisted mixing process of this invention contemplates combining the polymer with the additive (chemical agent) in the presence of supercritical carbon dioxide under mild temperature and pressure conditions. For example, the preferred operating temperature range for the supercritical carbon dioxide assisted mixing process is from sub-ambient temperature to about 60° C. The invention is not limited to using temperatures below 60° C.; however, it is preferred that temperatures be selected within the practice of this invention which do not adversely affect the stability of the additive, the polymer, or the solvent used to solubilize the additive (if any). The preferred operating pressure range for the supercritical carbon dioxide assisted process is 400 to 2,600 psia. Low temperatures (i.e., below 200° C.) and low pressures (less than 10,000 psi, and in the examples discussed herein, less than 3,000 psi) allow a number of materials to be handled without degradation. The invention is not limited to using pressures below 2,600 psia since the process will depend on the phase behavior of the additive (chemical agent), the solvent (if any), and the supercritical carbon dioxide. In some applications, the technique may be employed at pressures as high as 30,000 psi and a temperature low enough that the additive does not react or does not liquify.

Ultimately, a goal of the present invention is to produce a homogenous blend, and preferably a free flowing powder, of fluoropolymer associated with chemical agent. In some cases, the chemical agent may readily dissolve in the supercritical carbon dioxide solvent. However, in most cases, the chemical agent will not readily dissolve in the supercritical carbon dioxide, and this requires the use of a solution of chemical agent, which solution is added to a chamber or other vessel for combining the chemical agent with the fluoropolymer in the presence of supercritical carbon dioxide. As will be shown below, it is possible to associate the chemical agent with polymeric material effectively at low operation temperatures and low pressures if the chemical agent is first pre-dissolved, preferably virtually to saturation, in a suitable solvent that does not dissolve the polymeric material to any great extent, but where the solvent does dissolve in the supercritical carbon dioxide. The solvent plus chemical agent solution could range widely in weight percentage solvent to chemical agent (e.g., 1:9 to 9:1) The solvents of the crystalline solid additives (chemical agents) used in the practice of this invention include, but are not limited to, aprotic solvents such as acetone that easily dissolve the crystalline solid additive at room temperature. Solvents are preferred that are liquids at room temperature and that can dissolve large quantities of crystalline solid additive at room temperature or slightly elevated temperatures. The principal requirements of the solvent are that the supercritical carbon dioxide used to swell the polymeric material within the practice of this invention also be able to dissolve the solvent used to dissolve the crystalline solid material (chemical agent) and that the solvent does not dissolve the fluoropolymer to any great extent (e.g., less than approximately 1% by weight).

If the homogenous blend of polymer and chemical agent is to be powderized, a variety of mechanical mastication techniques can be used within the practice of this invention including without limitation ball milling and brabender mixing. In one embodiment of the invention, ball milling is utilized wherein the elastomeric polymer, such as the exemplary fluoropolymer (fluoropolymer A) set forth above, and the chemical agent, such as the exemplary amino substituted fluorinated solid additive (additive A) set forth above, are combined in a mixing chamber which includes a number of stainless steel balls. The purpose of the stainless steel balls function to transfer mechanical energy to the polymeric material and chemical agent to convert them to a powder. In this process, the chemical agent is first dissolved in a suitable solvent such as acetone. Preferably, the chemical agent is present in the acetone solution at virtually saturation level. The acetone solution and polymer are combined with the supercritical carbon dioxide solvent in the chamber at low pressure and temperature. The mixture is heated, pressurized, and agitated with the ball bearings. Then, the resulting material is cooled and de-pressurized to remove the supercritical carbon dioxide. Removal can be achieved by spraying the blend of polymer and chemical agent or simply by depressurizing (either abruptly (greater than 10 psi/min) or slowly (equal or less than 10 psi/min)) the vessel containing the blend of polymer and chemical agent. Acetone, or other suitable solvents, are preferably removed with the supercritical carbon dioxide since they are dissolved therein. Alternatively, solvents might also be removed by evaporation or other suitable technique. The resulting material is a powder which includes fluoropolymer/chemical agent particles. An exemplary process methodology is set forth below:

1. Add fluoropolymer (or other desired and suitable polymer) to the mixing chamber.
2. Dissolve the crystalline solid curing agent (or other suitable chemical agent) in a suitable solvent at room temperature (if the chemical agent is not readily soluble in the supercritical carbon dioxide).
3. Add a curing agent-solvent solution to the mixing chamber (if the chemical agent dissolves in the supercritical carbon dioxide the chemical agent can be combined with the polymer without a solvent).
4. Add stainless steel balls (if ball milling is used—other mastication techniques can be employed) to the mixing chamber for the mechanical mastication process.
5. Add supercritical carbon dioxide solvent to the mixing chamber.
6. Heat and pressurize the chamber at approximately 4° C./min (or other suitable rate) until the target temperature and pressure is reached (which will depend on the polymers and chemical agents which are chosen to be combined).
7. Mix the materials for a fixed amount of time (long enough to thoroughly intermingle the chemical agent and polymer, and long enough to allow the polymer to be expanded by the supercritical carbon dioxide-the mixing time will vary depending on the materials and conditions which are used).
8. Remove heat and slowly vent the mixing chamber to atmospheric conditions.

9. Open mixing chamber and recover the polymer-chemical agent blend (in the case of the two exemplary materials above, the blend will be a fluoropolymer-curing agent blend).
10. If desired, sift the blend to recover a powder of desired particle size.

The invention is particularly useful in forming powderized blends of thermosetting fluoropolymer resins and chemical agents, where the theremosetting polymer resins are capable of being crosslinked. These powderized blends can be molded, extruded, or processed by a variety of means and can become permanently hard or rigid when heated above a curing temperature so that chains become irreversibly joined or bonded together. Preferably, the irreversible bonding or crosslinking is achieved by heating the homogenous blend prepared by this invention to temperatures higher than those used in the blending process.

Figure 1:
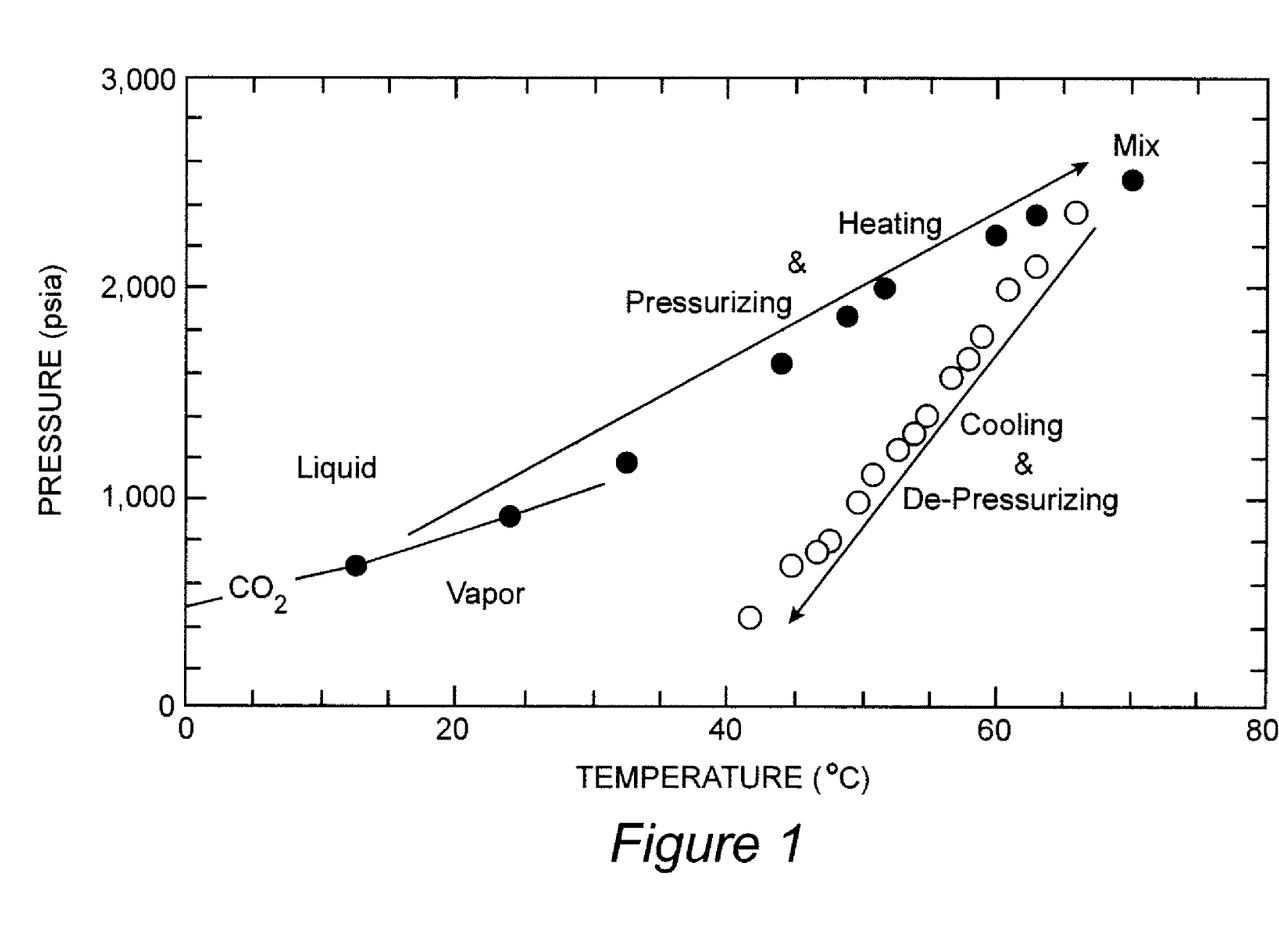
FIG. 1 is a graph showing an exemplary pictorial representation of the process steps for a fluoropolymer+additive+solvent+supercritical $CO_2$ mixture.

FIG. 1 provides a pictorial representation of some of the above process steps wherein an supercritical carbon dioxide-assisted ball mixing cycle is used in the presence of supercritical $CO_2$. The filled circles show the heating/pressurizing part of the process, and the open circles show the cooling depressurizing part of the process. For the exemplary compounds noted above, and for this exemplary process, mixing lasts one hour at 70° C. and 2,500 psig. As can be seen from FIG. 1, depressurizing is typically more rapid than pressurizing, while the relative increase in heat is more rapid than the heat decrease during depressurizing. Mixing occurs under temperature and pressure conditions which are optimized for the polymer and additive utilized.

A number of experiments were conducted using the fluoropolymer A and additive A noted above which demonstrated the viability and utility of this invention. In a series of preliminary experiments directed to assessing the various variables used in the process, the fluoropolymer A and additive A were combined at atmospheric pressure and a temperature of 60° C. in the absence of carbon dioxide. Mastication with stainless steel balls changes the physical appearance of the fluoropolymer in this instance from that of a clumpy powder to that of an open porous material, but very poor mixing or blending occurred between the fluoropolymer A and the additive A. In the preliminary experiments, the flouropolymer A was exposed to supercritical carbon dioxide in the mixing chamber at 60° C. and at 2500 psig, in the presence or absence of a small amount of acetone. These preliminary experiments also resulted in a significant change in the fluoropolymer A morphology from the untreated material. Specifically, the supercritical carbon dioxide changes the morphology of fluoropolymer A from a clumpy material to an open porous material due to the supercritical carbon dioxide solvent dissolving in the fluoropolymer A, thus expanding and swelling fluoropolymer A. When the pressure was relieved, the supercritical carbon dioxide solvent rapidly vents from the fluoropolymer A making the fluoropolymer A an open morphology with increased surface area. However, the presence of acetone in the combination had very little effect on the morphology of fluropolymer A. Finally, in the preliminary experiments, flouropolymer A and additive A were combined in the mixing chamber with a small amount of acetone and were exposed to processing conditions of 60° C. and 2000 psig. However, nitrogen ($N_2$) replaced supercritical carbon dioxide in this experiment. It was determined that nitrogen does very little to change the fluoropolymer A morphology. This is due to nitrogen only dissolving to a very low extent in fluoropolymer A. Hence, the effect of nitrogen is similar to hydrostatic pressure alone. These preliminary experiments show that if supercritical carbon dioxide solvent exhibits reasonable solubility in the polymer material, the final polymer morphology is more open and there is an increase in surface area of the polymer. Effective mixing of the fluoropolymer A with the additive A did not occur in any of these cases.

Table 1 shows how the inventive process works effectively and yields homogenous powderized blends of polymer and chemical agent. In Table 1, supercritical carbon dioxide assisted mechanical mastication was performed using an approximately 50 wt % additive A (curing agent)+ acetone (solvent for additive A) solution with supercritical carbon dioxide and fluoropolymer A added to the mixing chamber and being subjected to ball mixing at various temperatures and pressures.

TABLE 1

| Ex. # | Tem. (° C.) | Pre. psig | poly A gms | add. A gms | acetone gms | $CO_2$ gms | wt % acetone in BM | wt % poly A in BM | wt % add. A in BM | wt % add. A in poly A | % fines after sift |
|---|---|---|---|---|---|---|---|---|---|---|---|
| 1 | 60 | 2500 | 2.00 | 0.13 | 0.18 | 71.3 | 0.2 | 2.8 | 0.2 | 6.7 | 69 |
| 2 | 60 | 2500 | 2.02 | 0.19 | 0.27 | 81.7 | 0.3 | 2.5 | 0.2 | 9.4 | 80 |
| 3 | 60 | 2500 | 2.15 | 0.42 | 0.47 | 81.9 | 0.6 | 2.6 | 0.5 | 19.5 | 97 |
| 4 | 50 | 2600 | 1.99 | 0.79 | 0.79 | 82.3 | 0.9 | 2.3 | 0.9 | 39.4 | 21 |

From Table 1, it can be seen that for all four examples (Ex. #), the Supercritical carbon dioxide ball mixing is operated at approximately the same temperature (Tem.) and pressure (Pre.) and with supercritical $CO_2$. In all four cases, a predetermined amount of the additive A (add. A) is added to the mixing chamber from an approximately 50 wt % additive A plus acetone solution, and mastication is achieved with a ball mixer (BM).

Table 1 presents the percentage of fines after sifting. When the fluoropolymer A and additive A blend is recovered, it was very gently sifted, and the relative amount of material passing through the sifting screen was determined. This sifting offers a crude measure of the variation in particle size in the powder produced.

Experimental example 1 in Table 1 shows that 6.7 wt % additive A+fluoropolymer A is created with 69% fines. Experimental examples 2 and 3 show that with increasing concentrations of additive A, 9.4 wt % and 19.5 wt %, respectively, the amount of fines increased to 97%. The morphology of the materials for examples 1–3 was entirely different from the starting fluoropolymer A material alone, even though the blends consist of 93.3, 91.6 and 81.5 wt % fluoropolymer A, respectively. The blends in examples 1–3 are free flowing powders. That is, the exposure to supercritical carbon dioxide changed the morphology of the fluoropolymer and allowed incorporation of the additive A to produce a powderized, free-flowing, non-clumping material that is a blend of the two materials with particles of additive A associated with fluoropolymer A. The increase in percentage fines suggests that the solvent (i.e. acetone in this instance) helps disperse the additive A throughout the mixture and makes it easier for the supercritical carbon dioxide to transport the additive A to the sites in the fluoropolymer A that contain functional groups that can form a chemical association (e.g., complex) with the additive A.

Experimental example 4 shows the results when an excess of additive A is added to the ball mixer. As can be seen from Table 1, only a small amount of fines (21%) are obtained when the final blend is gently sifted. Also, the blend recovered from the mixing chamber showed some discoloration that suggested that the additive A, which is purple in color, resided on the outside of the surface of the fluoropolymer A, rather than being impregnated within (or coated by) fluoropolymer A. This result suggests that if a curing agent is used as the chemical agent within the practice of this invention, it will have its maximum effect on forming a fine, free flowing powdered blend if the amount of the curing agent is less than or close to (e.g., equal, slightly greater, etc.) the amount needed to titrate all of the functional sites in the polymer with which it is combined. In practice, the blending/powdering process of this invention works most effectively if enough additive is used so that all of the repeat groups with an active site are titrated with additive. However, the process also works very effectively if the ratio of additive-to-active polymer is greater than 1.0, which means that more than one additive molecule is associating (e.g., bonding, etc.) to the active site. Also, the process works effectively if the ratio is a little less than 1.0. In these instances "effective" means that greater than 80 wt % of the fluoropolymer charged to the process is converted to the free flowing powdered material. Ideally, the ratio of additive to active polymer site will be less than or about equal to 1.0:1.0 (i.e., in a range of slightly less than to slightly more than 1.0:1.0 of additive to polymer active site).

Table 2 shows the effect of mixing temperature and pressure on the supercritical $CO_2$ assisted mechanical mastication process of this invention using an approximately 50 wt % additive A+acetone solution.

example 2 in Table 2 shows that with lower pressures, a similar discolored, non-free flowing powder results. The optimum temperature and pressure varies depending on the polymer and chemical agent to be combined. As can be seen from Experimental example 3 in Table 2, even when the pressure is elevated slightly from that of experimental example 2, the pressure is still not enough to yield a free flowing powderized material.

Table 3 shows the effect of supercritical $CO_2$ assisted mechanical mastication on the blending of poly(butadiene) (PBD) with an approximately 50 wt % curing agent plus acetone solution performed under conditions similar to the technique used with fluoropolymer A.

TABLE 3

| Ex. # | Temp. ° C. | Pres. psig | PBD gms | addi. A. gms | acetone gms | $CO_2$ gms | wt % acetone in BM | wt % PBD in BM | wt % add. A in BM |
|---|---|---|---|---|---|---|---|---|---|
| 1 | 60 | 2800 | ~2.0 | 0.2 | 0 | 82.9 | 0 | 2.4 | 0.2 |
| 2 | 60 | 2800 | ~2.0 | 0.2 | 0.21 | 82.9 | 0.2 | 2.4 | 0.2 |

Polybutadiene does not include functional groups such as those which appear in fluoropolymer A noted above. In addition, polybutadiene is not a fluorinated elastomer. When the same supercritical carbon dioxide-assisted mechanical mastication process was performed using polybutadiene and additive A under conditions similar to those which were favorable when additive A and fluoropolymer A were combined to create a free flowing powder (e.g., 60° C. and 2800 psig), the same results were not achieved. In particular, the recovered blend was not a free flowing powder. In this instance, polybutadiene does not have a cyano group to form a complex with the additive A. Thus, in some applications, it may be necessary to have a functional group in the backbone or side chain of the polymer (e.g., a fluoropolymer) that can form a chemical complex with the additive material. When the ball mixing chamber is depressurized, the chemical complex would not let the chemical agent (additive) escape with the vented $CO_2$.

In the present invention, the functionalized fluoropolymer is expanded in supercritical carbon dioxide and impregnated with a chemical agent which interacts with the functional group. The fluoropolymers can be different from fluoropolymer A, and the process can be performed with fluoropolymers with a greater degree of substitution than 1 per hundred

TABLE 2

| Ex. # | Temp ° C. | Pres. psig | Poly A gms | add. A gms | acetone gms | $CO_2$ gms | wt % acetone in BM | wt % poly. A in BM | wt % add. A in BM | wt % add. A in poly. A |
|---|---|---|---|---|---|---|---|---|---|---|
| 1 | 34 | 2300 | 1.99 | 0.27 | 0.27 | 84.2 | 0.3 | 2.3 | 0.3 | 13.7 |
| 2 | 60 | 1070 | 2.01 | 0.22 | 0.22 | 40.2 | 0.5 | 4.9 | 0.5 | 10.7 |
| 3 | 60 | 1740 | 2.06 | 0.21 | 0.21 | 41.7 | 0.6 | 4.8 | 0.4 | 10.2 |

Experimental example #1 in Table 2 was conducted at lower temperature and was not transformed into a free flowing powder. The blend was also discolored suggesting an uneven distribution of additive A in fluoropolymer A. Experimental monomeric units. In addition, it should be understood that the invention can be performed with functional groups other than cyano moieties. It should also be understood that compositions including more than one polymer could be crosslinked or "cured" according to this invention so long as the chemical agent has functional groups that can interact with functional groups on the different polymers (e.g., two different fluoroelastomers, etc.). Likewise, it should also be understood that compositions including more than one chemical agent could be prepared according to this invention. In these instances, it may be advantageous to have at least one chemical agent with functional groups that interact with those on the polymer or polymers in the composition.

Fourier Transform Infrared (FTIR) and differential scanning calorimetry (DSC) analyses were performed to verify that the crystalline solid curing agent (additive A) was present in the fluoropolymer A when subjected to the supercritical carbon dioxide assisted ball milling operations under the optimum conditions set forth above. In addition, the analyses were performed to verify that the supercritical carbon dioxide assisted ball milled material has a greater concentration of additive A in fluoropolymer A than material blended by hand at room conditions (ambient temperature, pressure and humidity). For the blends of examples 1 and 2 from Table 1 above, a series of peaks between 2000 and tiator, the terminal ends are thought to be —COOH, —OSO₃H or their metal salts)

was combined with the additive

Fluoropolymer "B" is commercially available from Daikin Industries of Japan, and contains 65 mol % vinylidene fluoride, 14 mol % hexafluoropropylene, and 21 mol % tetrafluoroethlyene. Bisphenol AF (BAF) has two hydroxyl groups located at each end of the molecule. Table 4 shows the effect of supercritical $CO_2$ assisted mechanical mastication on the blending of fluoropolymer "B" with an approximately 50 wt % curing agent (BAF) plus acetone (predissolved) performed under conditions similar to that described above with fluoropolymer "A"+additive A.

TABLE 4

| Ex. # | Tem. (° C.) | Pre. psig | Fluoropolymer B gms | BAF gms | acetone gms | $CO_2$ gms | wt % acetone in BM | wt % fluoropolymer B in BM | wt % BAF in BM | wt % BAF in fluoropolymer B | % fines after sift |
|---|---|---|---|---|---|---|---|---|---|---|---|
| 1 | 60 | 2500 | 2.14 | .211 | .169 | 79.0 | 0.21 | 2.6 | 0.21 | 9.0 | 28 |
| 2 | 60 | 2500 | 2.13 | .563 | .487 | 82.9 | 0.56 | 2.5 | 0.56 | 20.9 | 47 |

3000 cm⁻¹ were found in the FTIR spectra. The peaks in this same 2000 to 3000 cm⁻¹ range do not appear in the spectra for pure fluoropolymer A or pure additive A, so these peaks are likely due to a strong chemical interaction or complex between the cyanide in fluoroplymer A and the amine groups in additive A. A much smaller peak at 2400 cm⁻¹ was observed for the handmixed blend created at room temperature, which is also likely to the complex between the cyanide group and the amine groups. However, compared to the FTIR scans for the blends of examples 1 and 2, it can be concluded that a significantly greater amount of complex formation results with the supercritical carbon dioxide assisted process. Comparison of DSC scans for the pure additive A, the pure fluoropolymer A, and the blend of example 2 from Table 1, showed the presence of the additive A peak when the blend is made. This also suggests that the additive is admixed with the fluoropolymer and that it is in crystalline form.

In another example of the supercritical $CO_2$ assisted mechanical mastication process of this invention being performed with fluoropolymers, a fluoropolymer with the chemical structure:

(these polymers are generally produced by emulsion polymerization methods using ammonium persulfate as an ini- Table 4 demonstrates that the present invention, whereby the polymer is expanded in SCF and impregnated with chemical agent which interacts with the functional group (an interaction of the functional group of the additive with the functional group of the polymer (in this instance $CH_2CF_2$), is applicable to semifluorinated elastomers and can be performed with polymers with a greater degree of substitution than 1 per hundred monomeric units. Further, the invention can be performed with functional groups other than cyano moieties (e.g., vinylidene fluoride, etc.) and can be performed with additives that do not contain amine functional groups (e.g., hydroxyls, etc.). In Table 4, the percent fines that are formed depends on the amount of additive relative to the amount of functional groups in the polymer.

The invention may be used to create polymers uniformly mixed with crystalline solid additives including curing agents, colorants, pigments, toughening agents, etc., the polymer and material would exhibit enhanced compatibility with other polymers of a similar chemical structure since the additive would be encased in or associated with the polymer coating would exhibit a higher degree of miscibility with the parent polymer material.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A process for producing homogenous blends of chemical agents and elastomeric fluoropolymers, comprising the steps of:

combining, in the presence of a supercritical carbon dioxide, at least one fluoropolymer capable of expansion in the presence of said supercritical carbon dioxide, which includes at least one functional group distributed at one or more locations along its chemical backbone, with at least one chemical agent that forms a crystalline solid and which includes at least one functional group, that is capable of associating with said at least one functional group distributed at said one or more locations along the chemical backbone of said fluoropolymer, said combining step permits said at least one chemical agent to impregnate within said at least one fluoropolymer;

permitting said at least one functional group on said at least one chemical agent to associate with said one functional group distributed at said one or more locations along the chemical backbone of said fluoropolymer, said permitting step producing a blend wherein said at least one fluoropolymer is associated with said at least one chemical agent at at least one of said one or more locations along the chemical backbone of said fluoropolymer and wherein said chemical agent is in crystalline form;

agitating or masticating said blend so as to produce a free flowing powder comprised of particles including said chemical agent in its crystalline form associated with said at least one fluoropolymer; and separating said supercritical carbon dioxide from said blend after said permitting step.

2. The process of claim 1 wherein said at least one chemical agent includes at least two functional groups, each of which can associate with said at least one functional group distributed at said one or more locations along the chemical backbone of said fluoropolymer so as to either combine two polymer chains of said fluoropolymer or to link two locations of said one or more locations or one polymer chain of said fluoropolymer.

3. The process of claim 2 wherein said two polymer chains of said fluoropolymer are combined by said chemical agent.

4. The process of claim 1 wherein said at least one fluoropolymer includes at least two different polymers.

5. A process for producing homogenous blends of chemical agents and elastomeric fluoropolymers, comprising the steps of:

combining, in the presence of a supercritical carbon dioxide, at least one fluoropolymer capable of expansion in the presence of said supercritical carbon dioxide, which includes at least one functional group distributed at one or more locations along its chemical backbone, with at least two different chemical agents each of which includes at least one functional group, and each of which is capable of associating with said at least one functional group distributed at said one or more locations along the chemical backbone of said fluoropolymer, said combining step permits said at least two different chemical agents to impregnate within said at least one fluoropolymer;

permitting said at least one functional group on said two different chemical agents to associate with said one functional group distributed at said one or more locations along the chemical backbone of said fluoropolymer, said permitting step producing a blend wherein said at least one fluoropolymer is associated with said at least different chemical agents at at least one of said one or more locations along the chemical backbone of said fluoropolymer; and separating said supercritical carbon dioxide from said blend after said permitting step.

6. A process for producing homogenous blends of chemical agents and elastomeric fluoropolymers, comprising the steps of:

combining, in the presence of a supercritical carbon dioxide, at least one fluoropolymer capable of expansion in the presence of said, supercritical carbon dioxide, which includes at least one functional group distributed at one or more locations along its chemical backbone, with at least one chemical agent which includes at least one functional group which is capable of associating with said at least one functional group distributed at said one or more locations along the chemical backbone of said fluoropolymer, said combining step permits said at least one chemical agent to impregnate within said at least one fluoropolymer, wherein said at least one polymer is permitting said at least one functional group on said at least one chemical agent to associate with said one functional group distributed at said one or more locations alone the chemical backbone of said fluoropolymer, said permitting step producing a blend wherein said at least one fluoropolymer is associated with said at least one chemical agent at at least one of said one or more locations along the chemical backbone of said fluoropolymer; and separating said supercritical carbon dioxide from said blend after said permitting step.

7. A process for producing homogenous blends of chemical agents and elastomeric fluoropolymers, comprising the steps of:

combining, in the presence of a supercritical carbon dioxide, at least one fluoropolymer capable of expansion in the presence of said supercritical carbon dioxide, which includes at least one functional group distributed at one or more locations along its chemical backbone that is selected from the group consisting of cyanide groups, hydroxyl groups, amine groups, carbonyl groups, vinyl groups, ethers, esters, and aromatics, with at least one chemical agent which includes at least one functional group which is capable of associating with said at least one functional group distributed at said one or more locations along the chemical backbone of said fluoronolymer, said combining step permits said at least one chemical agent to impregnate within said at least one fluoropolymer;

permitting said at least one functional group on said at least one chemical agent to associate with said one functional group distributed at said one or more locations along the chemical backbone of said fluoropolymer, said permitting step producing a blend wherein said at least one fluoropolymer is associated with said at least one chemical agent at at least one of said one or more locations along the chemical backbone of said fluoropolymer; and separating said supercritical carbon dioxide from said blend after said permitting step.

8. A process for producing homogenous blends of chemical agents and elastomeric fluoropolymers, comprising the steps of:

combining, in the presence of a supercritical carbon dioxide, at least one fluoropolymer capable of expansion in the presence of said supercritical carbon dioxide, which includes at least one functional group distributed at one or more locations along its chemical backbone, with at least one chemical agent which includes at least one functional group selected from the group consisting of cyanide groups, hydroxyl groups, amine groups, carbonyl groups, vinyl groups, ethers, esters, and aromatics and which is capable of associating with said at least one functional group distributed at said one or more locations along the chemical backbone of said fluoropolymer, said combining step permits said at least one chemical agent to impregnate within said at least one fluoropolymer;

permitting said at least one functional group on said at least one chemical agent to associate with said one functional group distributed at said one or more locations along the chemical backbone of said fluoropolymer, said permitting step producing a blend wherein said at least one fluoropolymer is associated with said at least one chemical agent at at least one of said one or more locations along the chemical backbone of said fluoropolymer; and separating said supercritical carbon dioxide from said blend after said permitting step.

9. A process for producing homogenous blends of chemical agents and elastomeric fluoropolymers, comprising the steps of:

combining, in the presence of a supercritical carbon dioxide, at least one fluoropolymer capable of expansion in the presence of said supercritical carbon dioxide, which includes at least one functional group distributed at one or more locations along its chemical backbone, with at least one chemical agent which includes at least one functional group which is capable of associating with said at least one functional group distributed at said one or more locations along the chemical backbone of said fluoropolymer wherein said at least one chemical agent is where X can be a hydrogen or a functional group and can be the same or different at different locations, said combining step permits said at least one chemical agent to impregnate within said at least one fluoropolymer;

permitting said at least one functional group on said at least one chemical agent to associate with said one functional group distributed at said one or more locations along the chemical backbone of said fluoropolymer, said permitting step producing a blend wherein said at least one fluoropolymer is associated with said at least one chemical agent at at least one of said one or more locations along the chemical backbone of said fluoropolymer; and separating said supercritical carbon dioxide from said blend after said permitting step.

10. The process of claim 1 wherein said chemical agent is present in said combining step in an amount less than or about equal to an amount needed to titrate all of said one or more functional groups distributed at said one or more locations along the chemical backbone of said fluoropolymer.

11. The process of claim 1 wherein said agitating or masticating step is performed during said permitting step.

12. The process of claim 11 wherein said step of agitating is performed by ball milling.

13. The process of claim 11 wherein said step of agitating is performed using a brabender apparatus.

14. The process of claim 11 wherein at least one of said combining and said permitting steps are performed at temperature and pressure conditions which, absent said supercritical carbon dioxide and agitation occurring said agitating step, are not sufficient to induce significant chemical reaction among said at least one polymer and said at least one chemical reagent.

15. The process of claim 11 wherein at least one of said combining and permitting steps are performed at a pressure of less than about 10,000 psi.

16. The process of claim 1 wherein said removing step is achieved during a spraying operation.

17. The process of claim 1 wherein said removing step is achieved by abrupt pressure reduction.

18. The process of claim 1 wherein said at least one chemical agent is a crosslinking additive.

19. The process of claim 1 wherein said at least one chemical agent is selected from the group consisting of crosslinking agents, dyes, pigments, fillers, and tougheners.

20. The process of claim 1 further comprising the step of solubilizing said at least one chemical agent in a solvent that dissolves in said supercritical carbon dioxide prior to said step of combining.

21. The process of claim 20 wherein said step of solubilizing is performed prior to said step of combining.

22. The process of claim 20 wherein said at least one chemical agent is solubilized in said solvent to approximately to saturation.

23. The process of claim 20 wherein said solvent does not solubilize said at least one fluoropolymer to a significant degree.

24. A process for producing a homogenous blend of a fluoroelastomer and a crosslinking agent comprising the steps of:

combining and where X can be a hydrogen or an amine moiety and can be the same or different at different locations, and wherein at least to locations are an amine moiety, and wherein the combining step is performed in the presence of supercritical carbon dioxide wherein the is pre-dissolved in acetone during said combining step;
allowing functional groups on the chemicals combined in said combining step to associate and form a blend; and
separating said supercritical carbon dioxide from said blend.

25. A homogenous blend of a fluoroelastomer and a crosslinking agent, formed by the steps of:
combining and where X can be a hydrogen or an amine moiety and can be the same or different at different locations, and wherein at least to locations are an amine moiety, and wherein the combining step is performed in the presence of supercritical carbon dioxide wherein the is pre-dissolved in acetone during said combining step;
allowing functional groups on the chemicals combined in said combining step to associate and form a blend; and
separating said supercritical carbon dioxide from said blend.

26. A process for producing a homogenous blend of a fluoroelastomer and a crosslinking agent comprising the steps of:
combining and wherein the combining step is performed in the presence of supercritical carbon dioxide wherein the is pre-dissolved in acetone during said combining step;
allowing functional groups on the chemicals combined in said combining step to associate and form a blend; and
separating said supercritical carbon dioxide from said blend.

27. A homogenous blend of a fluoroelastomer and a crosslinking agent, formed by the steps of:
combining and wherein the combining step is performed in the presence of supercritical carbon dioxide wherein the is pre-dissolved in acetone during said combining step;
allowing functional groups on the chemicals combined in said combining step to associate and form a blend; and
separating said supercritical carbon dioxide from said blend.

* * * * *